United States Patent
Homme

(10) Patent No.: US 8,854,748 B2
(45) Date of Patent: Oct. 7, 2014

(54) LENS BARREL AND IMAGE PICKUP APPARATUS

(75) Inventor: Shigeo Homme, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 168 days.

(21) Appl. No.: 13/218,167

(22) Filed: Aug. 25, 2011

(65) Prior Publication Data

US 2012/0050865 A1 Mar. 1, 2012

(30) Foreign Application Priority Data

Aug. 30, 2010 (JP) ................................. 2010-191904

(51) Int. Cl.
*G03B 17/04* (2006.01)
*G02B 27/64* (2006.01)
*G02B 7/10* (2006.01)

(52) U.S. Cl.
CPC .............. *G02B 7/102* (2013.01); *G02B 27/646* (2013.01); *G03B 17/04* (2013.01)
USPC .............................. 359/813; 359/557; 396/73

(58) Field of Classification Search
CPC .......... G02B 2205/00–2205/0092; G02B 7/14; G02B 7/102
USPC .............. 359/811–826, 554–577; 396/52–55, 396/72–88
See application file for complete search history.

(56) References Cited

U.S. PATENT DOCUMENTS

| | | | | |
|---|---|---|---|---|
| 4,952,955 A | * | 8/1990 | Iwata et al. | 396/75 |
| 7,433,137 B2 | * | 10/2008 | Irisawa | 359/819 |
| 2008/0310035 A1 | * | 12/2008 | Kato | 359/817 |
| 2009/0231709 A1 | * | 9/2009 | Nomura et al. | 359/557 |

FOREIGN PATENT DOCUMENTS

| | | |
|---|---|---|
| JP | 2004-233916 | 8/2004 |
| JP | 2006-154678 | 6/2006 |
| JP | 2009-251063 | 10/2009 |
| JP | 2010-107761 | 5/2010 |

OTHER PUBLICATIONS

Japanese Office Action, Notice of Reasons for Refusal, Patent Application No. 2010-191904, Date of Drafting: Feb. 20, 2014 (3 pages).
English translation of Japanese Office Action, Notice of Reasons for Refusal, Patent Application No. 2010-191904, Date of Drafting: Feb. 20, 2014 (4 pages).

* cited by examiner

*Primary Examiner* — Stephone B Allen
*Assistant Examiner* — Jeffrey Madonna
(74) *Attorney, Agent, or Firm* — Lucas & Mercanti, LLP

(57) ABSTRACT

In a lens barrel including an image pickup optical system containing plural lens groups and a barrel member for holding the image pickup optical system and conducting protruding and retracting, the lens frame holding a prescribed lens group of the image pickup optical system is swung so that the prescribed lens group is moved to a position where the optical axis is different from those of other lens groups at the time of the retraction, and in the process of changing from the protruded state to retracted state, the lens frame is swung by engagement with a cam-shaped portion of a first engagement member, and is then engaged with a second engagement member.

11 Claims, 11 Drawing Sheets

LENS BARREL AND IMAGE PICKUP APPARATUS

This application is based on Japanese Patent Application No. 2010-191904 filed on Aug. 30, 2010 with Japanese Patent Office, the entire content of which is hereby incorporated by reference.

BACKGROUND OF THE INVENTION

The present invention relates to a lens barrel designed to move a prescribed lens group to a position where the optical axis of the prescribed lens is different from that of another lens group at the time of retraction, and an image pickup apparatus provided with the lens barrel.

What is commonly known in the prior art includes a lens barrel which is retracted by reducing the interval between lens groups in an image pickup optical system in order to improve portability, when not used for photographing.

One of recent disclosures for further minimizing the thickness of the retracted barrel includes a lens barrel where a prescribed lens group is moved to a position where the optical axis of this is different from an optical axis of another lens group as well as the interval between lens groups is reduced (e.g., the Japanese Unexamined Patent Application Publication No. 2004-233916).

A common mechanism for moving a prescribed lens group to a position where the optical axis of this is different from that of another lens group generally has the following structure. As described in the aforementioned Patent Application Publication No. 2004-233916, a lens frame for holding the prescribed lens group is supported by a shaft in such a way that the frame can be swung, and is biased by a spring. This lens frame is brought in contact with a stopper and is stopped at a position where the optical axis agrees with that of another lens group. At the time of barrel refraction, a cam is engaged with the lens frame to make it to be swung against the bias pressure of the spring, whereby lens retraction is performed.

In the aforementioned lens barrel where a prescribed lens group is moved to a position where the optical axis is different from that of another lens group whereby lens retraction is performed, it is a common practice that a spring bias force is constantly applied to the engaged cam at the time of lens retraction. When this structure is exposed, for example, to a high temperature for a long time with the spring bias force applied thereto, the cam may be deformed by the bias force on a rare occasion if the cam is made of resin and is comparatively fragile. As a result, the lens frame may fail to perform a desired swinging operation and this problem has been one of the causes for reduction in operation reliability. Further, in a proposal for solving these problems, the cam is made of a metallic material. However, this fails to solve the problem of increased costs.

In view of the problems described above, it is one of the objects of the present invention to provide a thin lens barrel of high operation reliability at a reduced cost.

SUMMARY

To achieve at least one of the above mentioned objects, a lens barrel and image pickup apparatus reflecting one aspect of the present invention include the following.

(1) A lens barrel including: an image pickup optical system having a plurality of lens groups; a barrel member which holds the image pickup optical system and is protruded and retracted; and a first engagement member and a second engagement member for swinging a lens frame which holds a prescribed lens group of the image pickup optical system so as to move the prescribed lens group to a position where an optical axis of the prescribed lens group is different from an optical axis of another lens group when the barrel member is retracted, wherein, the lens frame is swung while being engaged with a cam-shaped portion of the first engagement member in a process of changing a state of the barrel member from a protruded state to a retracted state, and then the lens frame is engaged with the second engagement member.

(2) The lens barrel described in the above item (1), wherein the second engagement member is a part of a mechanism for camera shake compensation.

(3) The lens barrel described in the above item (2), wherein the lens frame is further swung by the mechanism for camera shake compensation.

(4) The lens barrel described in the above item (1), wherein a cam shape is formed on the second engagement member, and the lens frame is further swung by the cam shape of the second engagement member.

(5) An image pickup apparatus provided with the lens barrel described in any one of the above items (1) through (4), and an imaging element for photoelectric conversion of a subject image.

Each of FIGS. 6a-6d is a diagram showing the positional relationship of a pin, cam-shaped portion and bottom board in the process of changing from the protruded state of a lens barrel to the retracted state in the first embodiment.

Figure 7:
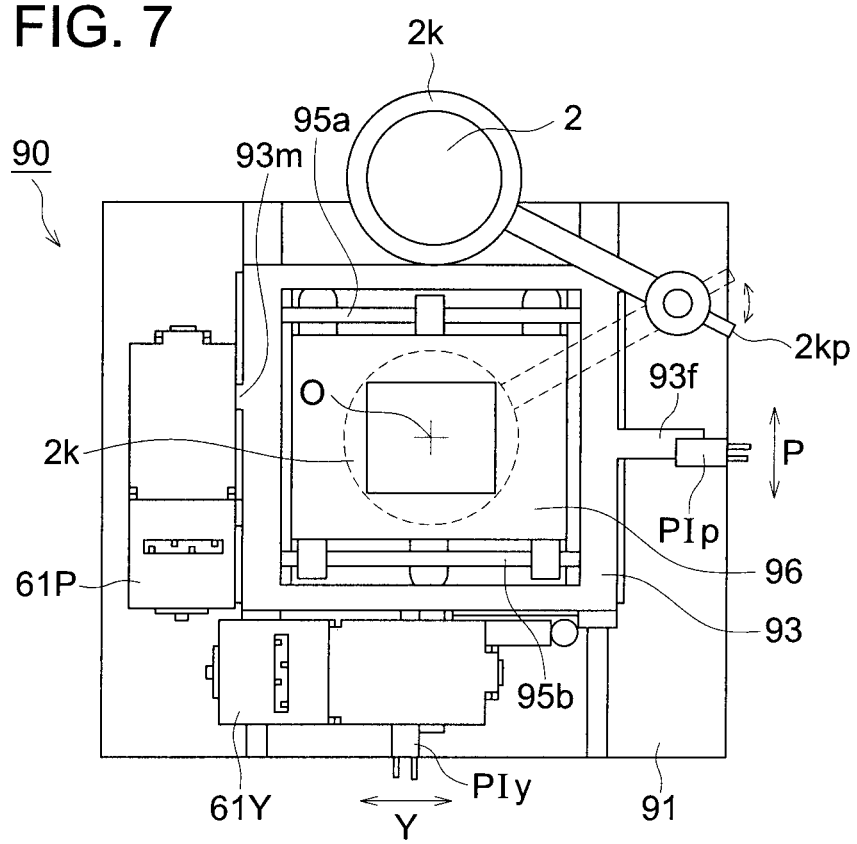

FIG. 7 is a diagram showing the positional relationship of a second lens group lens frame and imaging element moving mechanism in the process of changing from the protruded state of a lens barrel to the retracted state in the first embodiment.

Figure 8:
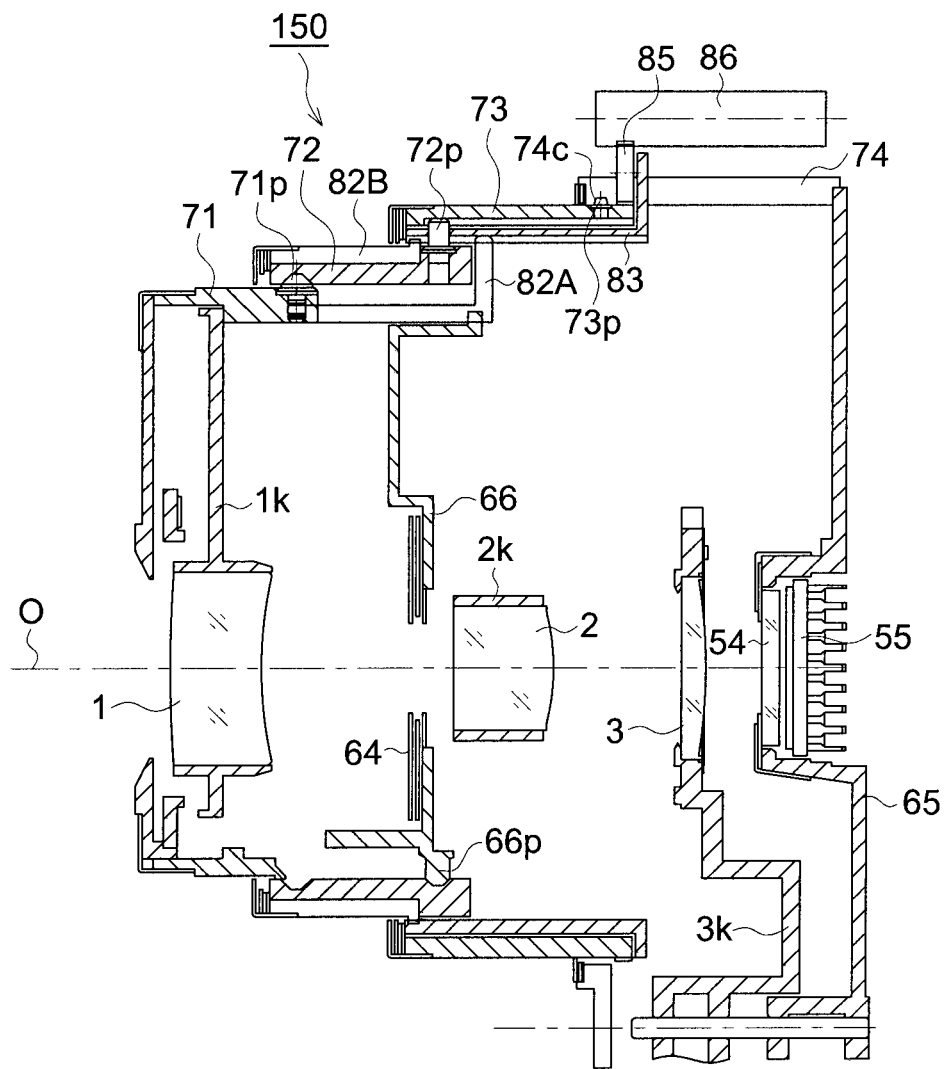

FIG. 8 is a schematic cross sectional view showing a protruded state of the lens barrel of the second embodiment.

Figure 9:
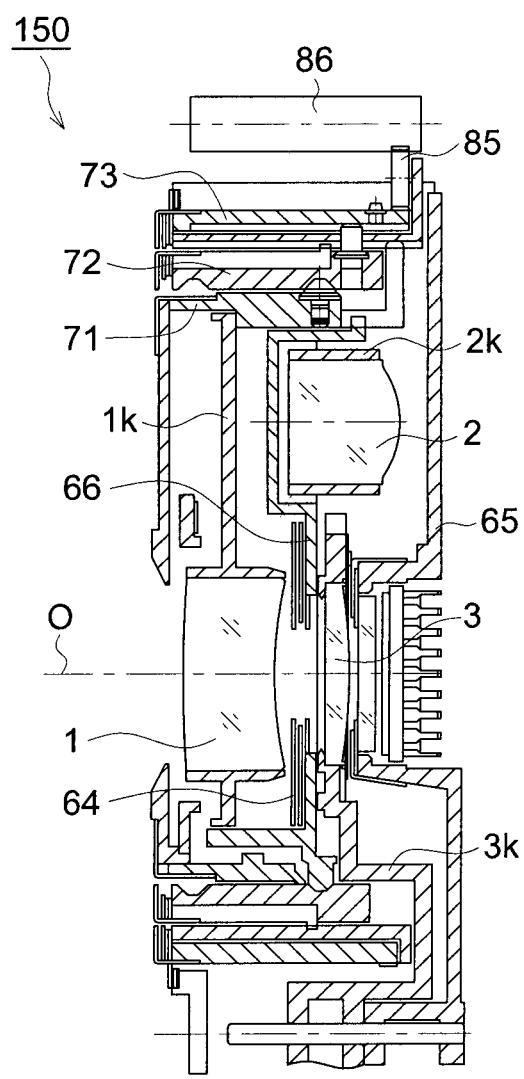

FIG. 9 is a schematic cross sectional view showing a retracted state of the lens barrel in the second embodiment.

Figure 10:
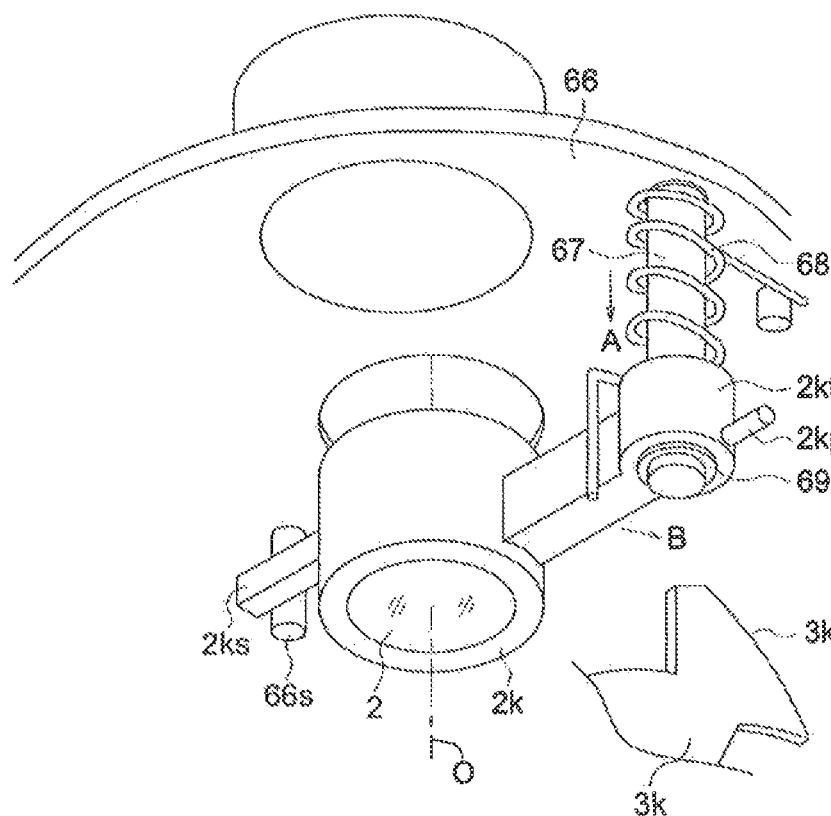

FIG. 10 is a perspective view showing the second lens group lens frame of a lens barrel in the second embodiment.

Each of FIGS. 11a-11d is a diagram showing the positional relationship of a pin and cam-shaped portion in the process of changing from the protruded state of a lens barrel to the retracted state in the second embodiment.

DETAILED DESCRIPTION OF THE PREFERRED EMBODIMENT

The following describes the present invention with reference to embodiments without the present invention being restricted thereto.

Figure 1:
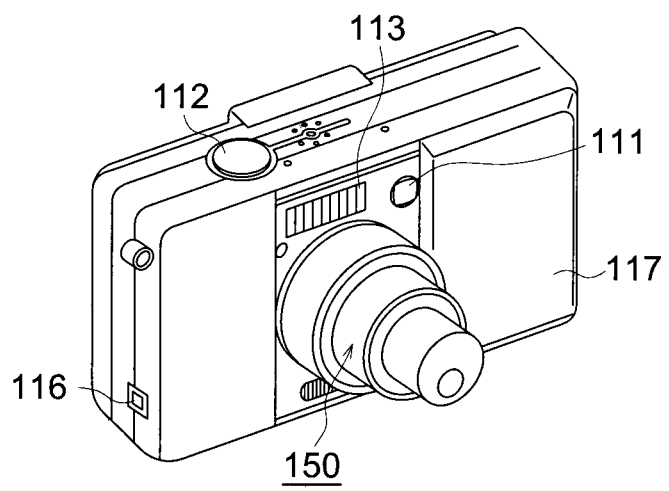
FIG. 1 is an external view representing a camera as an example of the image pickup apparatus provided with a lens barrel in the present embodiment.

FIG. 1 is an external view representing a camera as an example of the image pickup apparatus provided with a lens barrel in the present embodiment.

In FIG. 1, the numeral 150 represents a lens barrel of the present embodiment having a zooming imaging optical system inside. The numeral 111 represents a finder window, the numeral 112 represents a release button, the numeral 113 represents a flush light emitting section, and the numeral 116 represents an external input/output terminal (for example, USB terminal). The numeral 117 represents a slide barrier and the lens barrel 150 is retracted when the slide barrier 117 is operated in a direction to close. By pressing the release button to a first stage, the camera is activated to be ready for photographing, that is, focusing and photometry, and to a second stage, photographing exposure is executed.

Although not illustrated, the back of the camera is provided with a finder ocular portion, a zoom button for zooming up and down, an image display section for displaying an image and other text information, and a menu/set button. The camera bottom surface is equipped with a tripod hole and a slot for a battery for power supply to various portions and a card used to record photographed images.

The following describes the lens barrel 150 of the present embodiment.

First Embodiment

Figure 2:
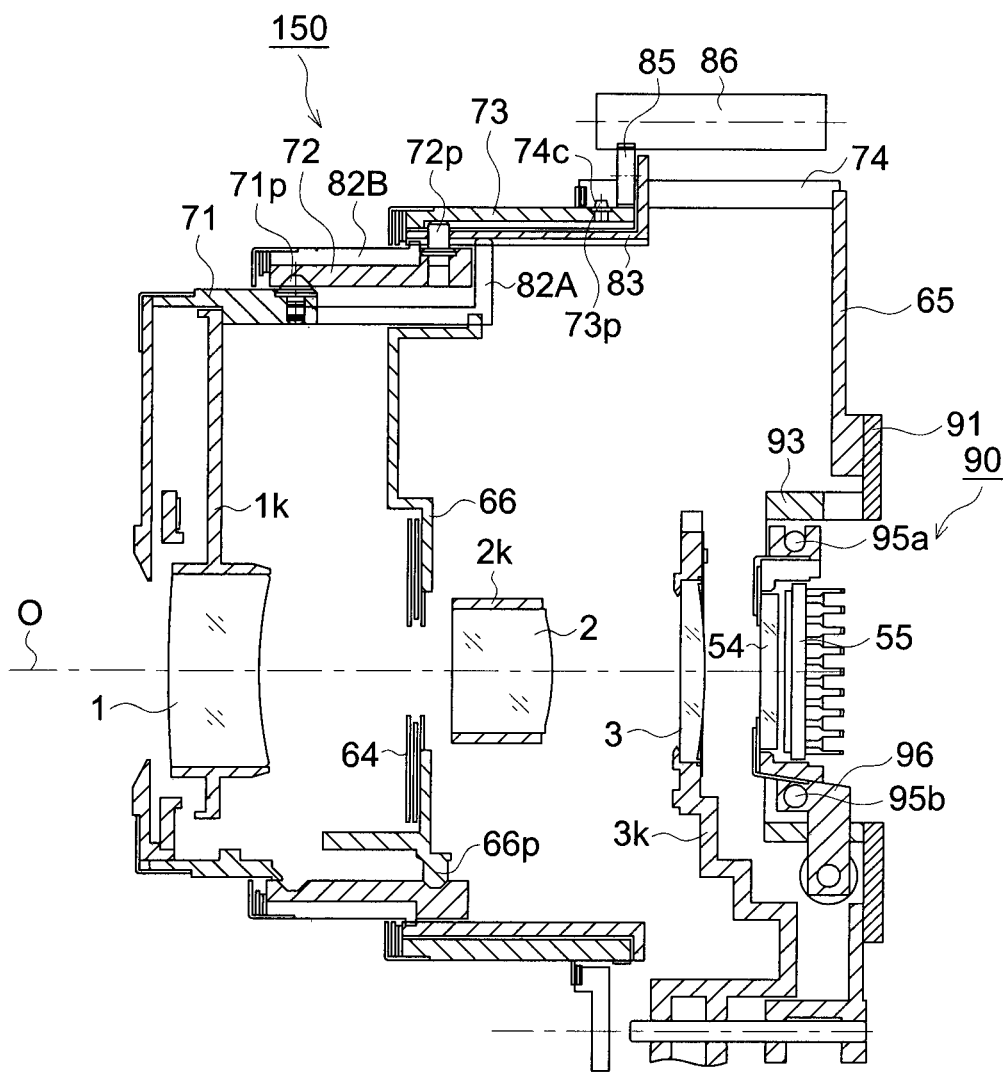
FIG. 2 is a schematic cross sectional view showing a protruded state of the lens barrel of the first embodiment.

FIG. 2 is a schematic cross sectional view showing the protruded state of the lens ban 1150 of the first embodiment (in the photographing mode). The state of the wide-angle end is shown in this diagram.

In FIG. 2, the symbol O represents an optical axis, the numeral 1, 2 and 3 represent a first lens group, a second lens group and a third lens group respectively, and the numeral 54 represents an optical filter where an infrared cut filter and optical low pass filter are laminated. These configure an imaging optical system. The numeral 55 represents an imaging element.

The symbol 1k represents a first lens group lens frame to retain the first lens group 1 and is retained by the front cylinder 71. The symbol 2K represents a second lens group lens frame to retain the second lens group 2. The second lens group lens frame k2 is retained by second lens group moving frame 66 and is configured to be capable of moving out from the optical axis O by swinging. The numeral 64 represents an aperture and/or shutter unit retained by the second lens group moving frame 66. The symbol 3k representing a third lens group lens frame retains the third lens group 3 and is configured to be able to move in a direction of the optical axis O by an unillustrated stepping motor. The third lens group lens frame 3k can move independently thus focusing can be carried out by moving the third lens group 3. The numeral 65 represents a bottom board and it is provided with an imaging element moving mechanism 90 for camera shake compensation by moving the imaging element 55 along the surface perpendicular to the optical axis O.

Next, motion of lens barrel 150 will be described.

In FIG. 2, the fixed barrel 74 is mounted onto the bottom board 65. On the inner surface of the fixed barrel 74, a cam groove 74c is formed. The numeral 73 represents an intermediate barrel which is rotated by an unillustrated motor, through the intermediate barrel drive gear 85, a reduction gear train and column-shaped gear 86. The intermediate barrel 73 is moved by this rotation in the direction of the optical axis O while a cam pin 73p implanted in the intermediated barrel 73 is guided by the cam groove 74c formed on the fixed barrel 74.

The guide ring 83 is engaged with a straight guide section formed on the fixed barrel 74 to be capable of straight movement in the direction of the optical axis O and moves straight in the optical axis O direction while maintaining the intermediate barrel drive gear 85, in accordance with movement of the intermediate barrel 73 in the direction of the optical axis O. On this guide ring 83, a cam groove and a straight guide section are formed.

In a cam cylinder 72, there is implanted cam pin 72p which engages with the intermediate barrel 73 and guide ring 83. Cam cylinder 72 rotates along with rotation of the intermediate barrel 73 with which the cam pin 72p engages, and moves in the direction of the optical axis O while being guided by the cam groove formed on the guide ring 83, with which the cam pin 72p engages. That is, the earn pin 72p is engaged with a key way formed to be parallel with the optical axis of intermediate barrel 73 and with the cam groove formed on the guide ring 83. On an inner surface of the cam cylinder 72, there is formed a cam groove to guide the front cylinder 71 and second lens group moving frame 66 respectively.

The straight guide 82A is engaged with a straight guide section formed on the guide ring 83 to be able to move straight in the direction of the optical axis O and moves straight in the direction of the optical axis O in accordance with movement of the cam cylinder 72 in the direction of the optical axis O. The decorative cylinder 82B is also engaged with the straight guide section formed on the guide ring 83 to be able to move straight, and moves straight in the direction of the optical axis O in accordance with movement of the cam cylinder 72 in the direction of the optical axis O.

The front cylinder 71 on which the cam pin 71p to engage with one cam groove formed on the cam cylinder 72 is implanted, is engaging with the straight guide 82A. Also the second lens group moving frame 66 on which the cam pin 66p to engage with another cam groove formed on the cam cylinder 72 is implanted, is engaging with the straight guide 82A.

In this way, the front cylinder 71 and second lens group moving frame 66 are moved straight in the direction of the optical axis O by rotation of the cam cylinder 72, being guided by the cam grooves engaged respectively, thus a distance between the first lens group 1 retained by the front cylinder 71 and the second lens group 2 retained by the second lens group moving frame 66 is changed so as to carry out zooming.

From this state, the intermediate barrel drive gear 85 is further driven to rotate the intermediate barrel 73, and positions of the first lens group and second lens group are changed by the cam groove formed on the inner surface of the cam cylinder 72 so as to carry out zooming.

The above is an outline of movement of the lens barrel 150 of the first embodiment during the protrusion.

Figure 3:
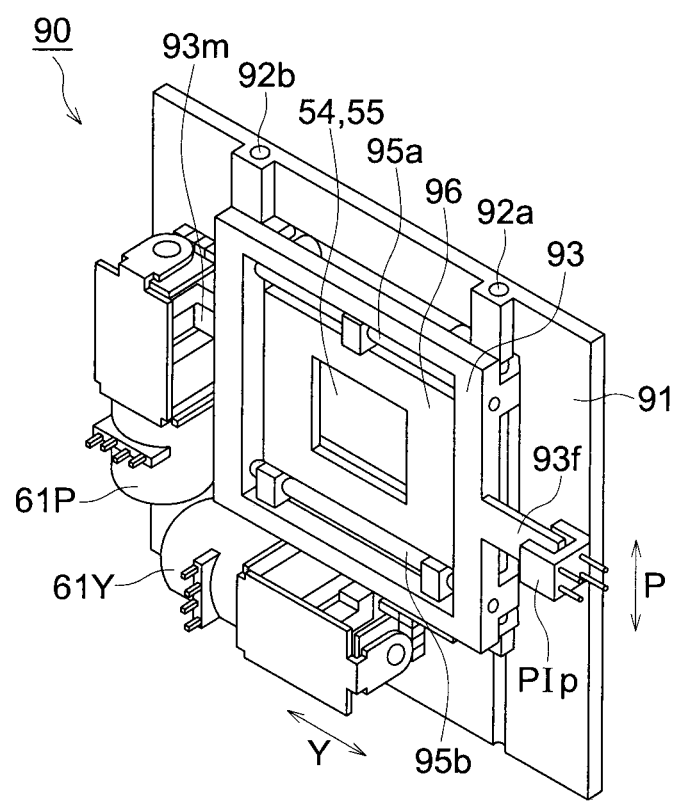
FIG. 3 is a perspective view showing an extracted form of the imaging element moving mechanism.

FIG. 3 is an extracted perspective view of the imaging element moving mechanism 90.

In the imaging element moving mechanism 90 shown in FIG. 3, the first moving member 96 holds an imaging element 55 and optical filter 54 composed of an infrared cut filter or an optical low-pass filter in front of the imaging element 55.

On the second moving member 93, there are fixed two guide shafts 95a and 95b each representing a guide member, and first moving member 96 is arranged to be guided by the guide shafts 95a and 95b to be capable of moving in the direction of the illustrated arrow Y. That is, the second moving member 93 holds the first moving member 96.

On the base plate 91, there are fixed two guide shafts 92a and 92b each representing a guide member, and the second moving member 93 is guided by the guide shafts 92a and 92b to be capable of moving in the direction of the illustrated arrow P.

Further, the arm portion 93m and PI shielding section 93f are formed integrally on the second moving member 93. The arm portion 93m is in contact with the nut representing the second female screw member that engages with the lead screw which is the second male screw member rotated by the stepping motor 61P serving as the second motor. Owing to this, by rotation of the stepping motor 61P, the second moving member 93 is moved in the direction of the arrow P. The PI shielding section 93f is configured to pass through the light emitting and receiving section of the photo interrupter PIp which is an initial position detecting section fixed on the base plate 91.

Similarly, the first moving member 96 is provided with an arm portion and PI shielding section formed as an integral unit, although not illustrated. The arm portion is in contact with the nut as a first female screw member that is engaged with the lead screw as a first male screw member which is rotated by the stepping motor 61Y as a first motor. This arrangement allows the first moving member 96 to be moved in the direction of the arrow Y by the rotation of the stepping motor 61Y. The PI shielding section is formed to pass through the light transmitting and receiving sections of the photo interrupter PIy as an initial position detector fixed onto the base plate 91.

Owing to this, by driving stepping motors 61P and 61Y, it is ensured that the first moving member 96, that is, the imaging element 55 can be moved in a plane that is perpendicular to the optical axis OB of the image pickup optical system.

Figure 4:
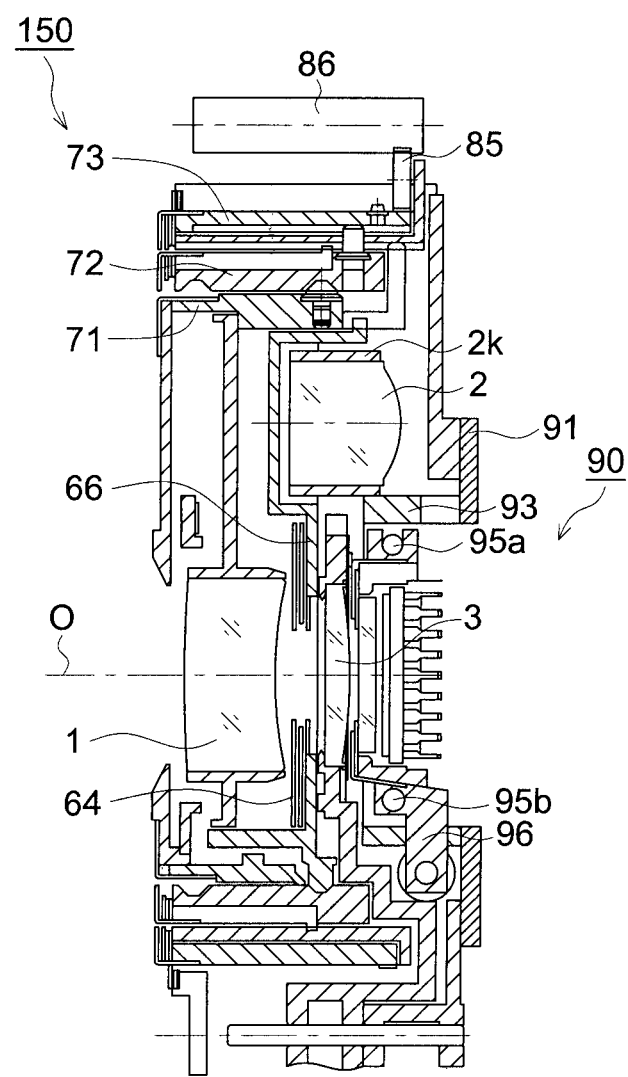
FIG. 4 is a schematic cross sectional view showing a retracted state of the lens barrel of the first embodiment.

FIG. 4 is a schematic cross-sectional view showing a refracted state of the lens barrel 150 related to the first embodiment.

To realize the retracted state of the lens barrel 150 shown in FIG. 4, the intermediate barrel 73 is rotated reversely by rotating the intermediate barrel drive gear 85 in the reverse direction through an unillustrated motor, a reduction gear train and a column-shaped gear 86, after third lens group lens frame 3k is moved to the bottom board 65 side from the state shown in FIG. 2.

By the reverse rotation of the intermediate barrel 73, the cam cylinder 72 is rotated reversely, then the front cylinder 71 and second lens group moving frame 66 approach each other while being guided by the cam grooves engaged respectively, and the intermediate barrel 73 and cam cylinder 72 move to the bottom board 65 side.

At this stage, the second lens group lens frame 2k retained by the second lens group moving frame 66 is rotatably supported by an unillustrated rotary shaft, and swings centering around the rotary shaft and moves away to a position different from the optical axis of other lens groups. Further, the second lens group lens frame 2k is structured to carries out sliding movement with respect to the rotary shaft after evacuating from the optical axis O.

The intermediate barrel 73 and cam cylinder 72 move to the bottom board 65 side and the third lens group 3, second lens group moving frame 66, aperture and/or shutter unit 64 and first lens group I come close to each other maintaining minimum distances to realize the retraction state.

In the process of changing from the protruded state to the retracted state, the second lens group lens frame 2k is brought to a position where the optical axis is different from those of other lens groups. After that, the lens frame section of the second lens group lens frame 2k is engaged with the second moving member 93 of the imaging element moving mechanism 90, as illustrated. The lens frame section of the second lens group lens frame 2k is moved upward on the figure by the movement of the second moving member 93 of the imaging element moving mechanism 90.

Figure 5:
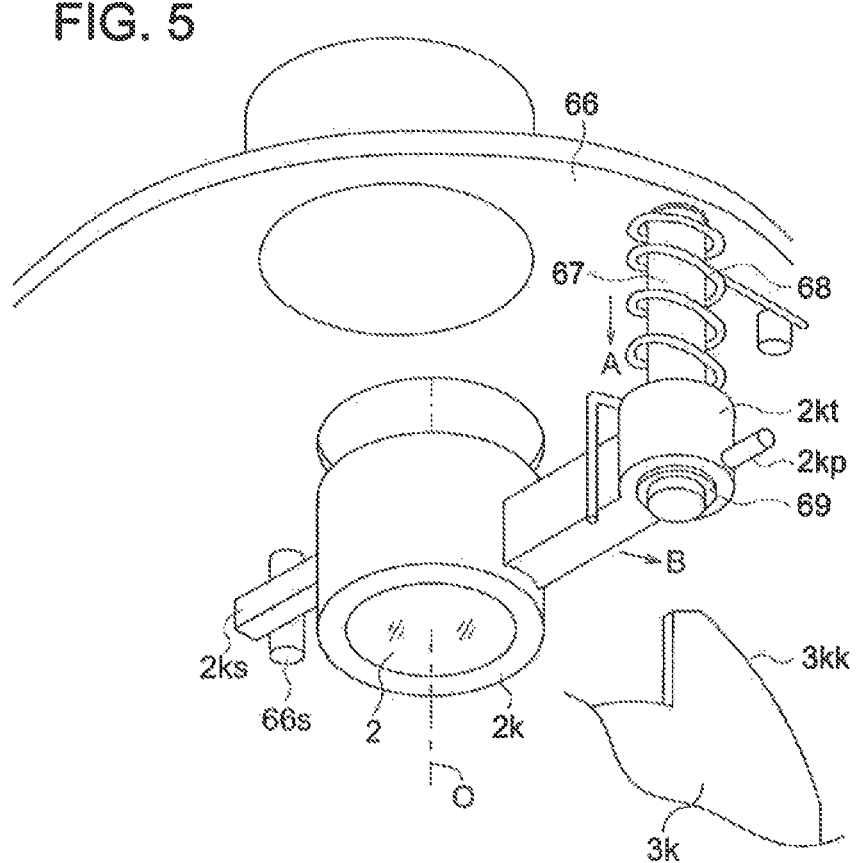
FIG. 5 is a perspective view showing a second lens group lens frame of the lens barrel in the first embodiment.

FIG. 5 is a perspective view showing a second lens group lens frame 2k of the lens barrel in the first embodiment. This view shows the second lens group lens frame 2k and the second lens group moving frame 66 as observed from the imaging element. It shows the state where the lens barrel protrudes and the second lens group 2 is located on the optical axis O to enable photographing.

As shown in the diagram, the second lens group moving frame 66 is provided with a rotary shaft 67, and the rotary shaft 67 is inserted in the cylindrical portion 2kt formed on the second lens group lens frame 2k. A torsion coil spring 68 is mounted between the cylindrical portion 2kt and the second lens group moving frame 66, and the rotary shaft 67 is provided with a retaining device 69 for the cylindrical portion 2kt.

This torsion coil spring 68 applies bias force to the cylindrical portion 2kt formed on the second lens group lens frame 2k in the direction of the arrow A using the coil structure. Using both ends, the torsion coil spring 68 applies bias force to the arm portion of the second lens group lens frame 2k in the direction of the arrow B. The projection 2ks formed on the second lens group lens frame 2k comes in contact with the stopper pin 66s formed on the second lens group moving frame 66 so that the second lens group lens frame 2k, i.e., the second lens group 2 is positioned on the optical axis O. Further, a pin 2kp is formed on the cylindrical portion 2kt.

The symbol 3kk indicates a cam-shaped portion formed on the third lens group lens frame 3k. The pin 2kp and cam-shaped portion 3kk are formed at the position where engagement with each other is performed in the process of changing &Hu the protruded state to the retracted state. When the lens barrel has protruded to enable photographing, the pin 2kp is separated from the cam-shaped portion 3kk.

Each of FIGS. 6a-6d is a diagram showing the positional relationship of a pin 2kp, cam-shaped portion 3kk and bottom board 65 in the process of changing from the protruded state of the lens barrel 150 to the retracted state in the first embodiment.

FIG. 7 is a diagram showing the positional relationship of a second lens group lens frame 2k and imaging element moving mechanism 90 in the process of changing from the protruded state of the lens barrel 150 to the retracted state in the first embodiment.

Referring to FIGS. 6a-6d and FIG. 7, the following describes the operation of the second lens group lens frame 2k in the process of changing from the protruded state of the lens barrel 150 to the retracted state in the first embodiment.

Figure 6A:
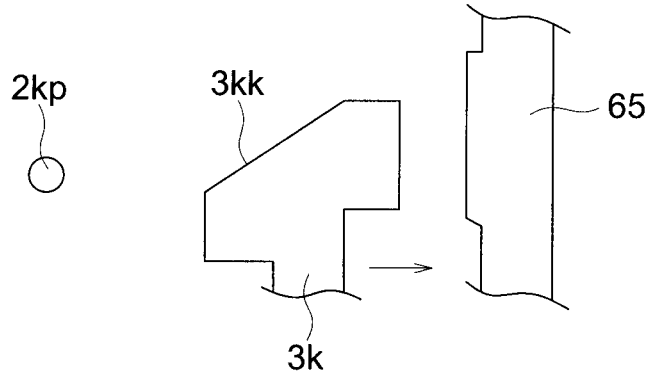

When the lens barrel has protruded as illustrated in FIG. 2 and FIG. 5, the pin 2kp, the cam-shaped portion 3kk and bottom board 65 are separated from one another, as shown in FIG. 6a.

Figure 6B:
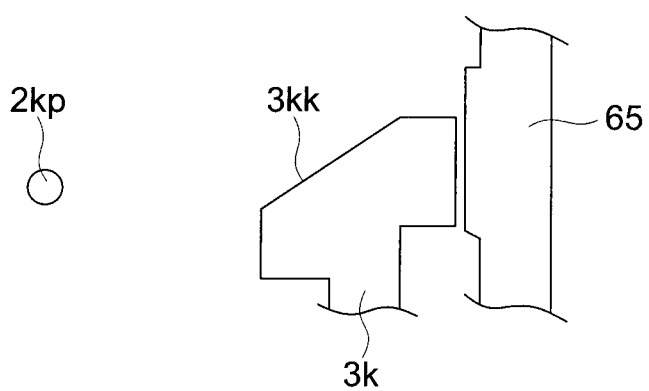

To change the lens barrel from the protruded state to the retracted state, the third lens group lens frame 3k is moved to the bottom board 65 side (imaging element side), as shown above. This ensures that the cam-shaped portion 3kk formed on the third lens group lens frame 3k comes closer to the bottom board 65, as shown in FIG. 6b. In this case, the second lens group lens frame 2k is located at the position indicated by the broken line of FIG. 7.

Figure 6C:
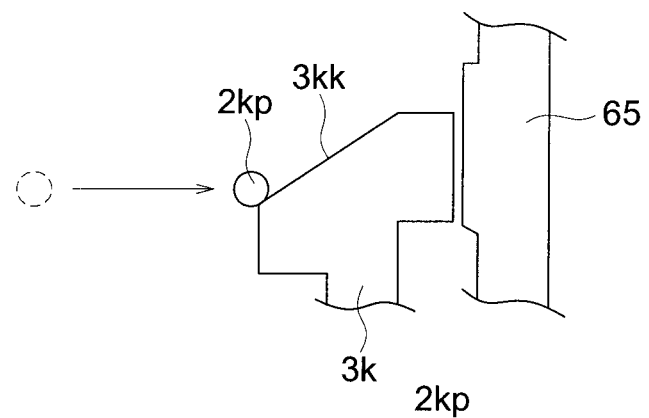

When the third lens group lens frame 3k has been moved, the second lens group moving frame 66 travels toward the bottom board 65 (imaging element), as described above. The pin 2kp formed on the cylindrical portion 2kt of the second lens group lens frame 2k is engaged with the cam-shaped portion 3kk, as illustrated in FIG. 6c.

After the pin 2kp has been engaged with the cam-shaped portion 3kk, the second lens group moving frame 66 is further moved toward the bottom board 65 (imaging element). This allows the pin 2kp to travel along the slope of the cam-shaped portion 3kk. The second lens group lens frame 2k of FIG. 5 is swung in the direction opposite to the B-marked direction against the bias force of the torsion coil spring 68.

Figure 6D:
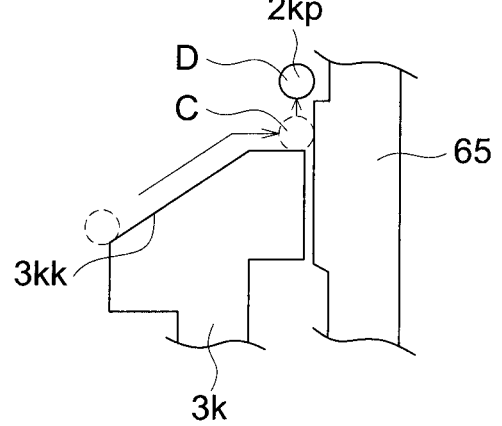

When the second lens group moving frame 66 has further traveled toward the bottom board 65, the pin 2*kp* is swung to a prescribed position of retraction at the position C on the cam-shaped portion 3*kk* (wherein the optical axis is different from those of other lens groups), as shown in FIG. 6*d*. This allows the lens frame section of the second lens group lens frame 2*k* to be moved from the position illustrated by the broken line of FIG. 7 to the position illustrated by the solid line. Thus, the lens frame section of the second lens group lens frame 2*k* is swung to the position where it does not interfere with the second moving member 93 of the imaging element moving mechanism 90, as viewed in the direction of optical axis.

When the pin 2*kp* has come in contact with the bottom board 65, the second lens group moving frame 66 is further moved toward the bottom board 65. This allows the second lens group lens frame 2*k* to slide and move along the rotary shaft 67 of FIG. 5 in the direction opposite to the A-marked direction against the bias force of the torsion coil spring 68. When the second lens group moving frame 66 has come closer to the bottom board 65, the end of lens frame section of the second lens group lens frame 2*k* is located outside the second moving member 93 of the imaging element moving mechanism 90, as shown in FIG. 4.

After the second lens group moving frame 66 has come to a prescribed position at the time of retraction on the bottom board 65 side and has stopped there, the stepping motor 61P of the imaging element moving mechanism 90 is driven, and the second moving member 93 is moved upward in the figure. This allows the pin 2*kp* to be separated from the cam-shaped portion 3*kk*, and to come to the position D of FIG. 6*d*.

The retracted state of FIG. 4 is reached by the aforementioned procedure.

To be more specific, in the process of changing from the protruded state to the retracted state, the lens barrel 150 of the first embodiment ensures that the second lens group lens frame 2*k* is moved to the position where the optical axis is different from those of other lens groups by being engaged with the cam-shaped portion 3*kk* formed on the third lens group lens frame 3*k*, as the first engagement member, and being swung. After that, the second lens group lens frame 2*k* is engaged with the second moving member 93 of the imaging element moving mechanism 90 as the second engagement member. Then the second lens group lens frame 2*k* is further swung by the imaging element moving mechanism 90.

To be more specific, at the time of lens retraction, the bias force of the torsion coil spring 68 applied to the second lens group lens frame 2*k* is received by the second moving member 93 of a rigid imaging element moving mechanism 90. Thus, even if the lens group is exposed to severe working conditions for a long time, this structure avoids the possibility of the lens group being deformed by the bias force, and enhances the operation reliability. Further, the cam for swinging can be made of resin, with the result that a lens barrel of reduced costs can be produced.

In the present example, the second lens group lens frame 2*k* is further swung by the second moving member 93 of the imaging element moving mechanism 90, for the sake of explanation. Without being restricted thereto, however, it is also possible to make such arrangements that the portion of the lens frame section of the second lens group lens frame 2*k* coming in contact with the second moving member 93 is designed in a tapered shape. After this tapered portion has come in contact with the second moving member 93, the second lens group lens frame 2*k* is further swung along the taper shape.

In this example, an imaging element moving mechanism was used as a shake compensation device for the sake of explanation. Without being restricted thereto, it is also possible to use the mechanism where the lens group is moved for shake compensation. In this case, the lens group moving mechanism for shake compensation is used as the second engagement member, and is engaged with the lens frame section of the second lens group lens frame 2*k*. This structure provides the same effect.

Second Embodiment

FIG. 8 is a schematic cross sectional view showing the protruded state (photographing state) of the lens barrel 150 of a second embodiment. It should be noted that the state of the wide-angle end is illustrated in FIG. 8.

FIG. 9 is a schematic cross sectional view showing the retracted state of the lens barrel 150 in the second embodiment.

In the lens barrel 150 of the second embodiment of FIG. 8 and FIG. 9, the operations of protruding and retraction are the same as those shown in FIG. 2 and FIG. 4. The imaging element moving mechanism 90 for shake compensation is omitted. Thus, the description of protrusion and retraction is omitted. Only the swinging operation of the second lens group lens frame 2*k* will be described.

FIG. 10 is a perspective view showing a second lens group lens frame 2*k* of the lens barrel in the second embodiment. This view shows the second lens group lens frame 2*k* and the second lens group moving frame 66 as observed from the imaging element. It shows the protruded state of the lens barrel and the second lens group 2 is located on the optical axis O to enable photographing.

As shown in the diagram, the second lens group moving frame 66 is provided with a rotary shaft 67, and the rotary shaft 67 is inserted in the cylindrical portion 2*kt* formed on the second lens group lens frame 2*k*. A torsion coil spring 68 is mounted between the cylindrical portion 2*kt* and the second lens group moving frame 66, and the rotary shaft 67 is provided with a retaining device 69 for the cylindrical portion 2*kt*.

This torsion coil spring 68 applies bias force to the cylindrical portion 2*kt* formed on the second lens group lens frame 2*k* in the direction of the arrow A using the coil structure. Using both ends, the torsion coil spring 68 applies bias force to the arm portion of the second lens group lens frame 2*k* in the direction of the arrow B. The projection 2*ks* formed on the second lens group lens frame 2*k* comes in contact with the stopper pin 66s formed on the second lens group moving frame 66 so that the second lens group lens frame 2*k*, i.e., the second lens group 2 is positioned on the optical axis O. Further, a pin 2*kp* is formed on the cylindrical portion 2*kt*.

The symbol 3*kk* indicates a cam-shaped portion formed on the third lens group lens frame 3*k*. The numeral 65*k* indicates cam-shaped portion formed on the bottom board 65. The pin 2*kp*, cam-shaped portion 3*kk* and cam-shaped portion 65*k* are formed at the position where engagement with each other is performed in the process of changing from the protruded state to the retracted state. When the lens barrel has protruded to enable photographing, the pin 2*kp*, cam-shaped portion 3*kk* and cam-shaped portion 65*k* are separated from one another.

Each of FIGS. 11*a*-11*d* is a diagram showing the positional relationship of a pin 2*kp*, cam-shaped portion 3*kk* and cam-shaped portion 65k in the process of changing from the protruded state of the lens barrel 150 to the retracted state in the second embodiment.

Figure 11A:
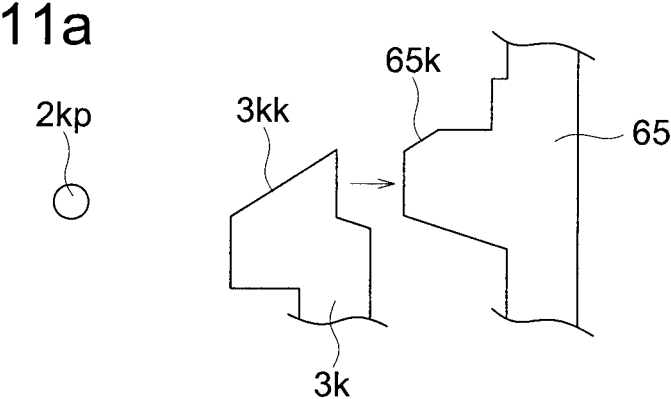
Figure 11B:
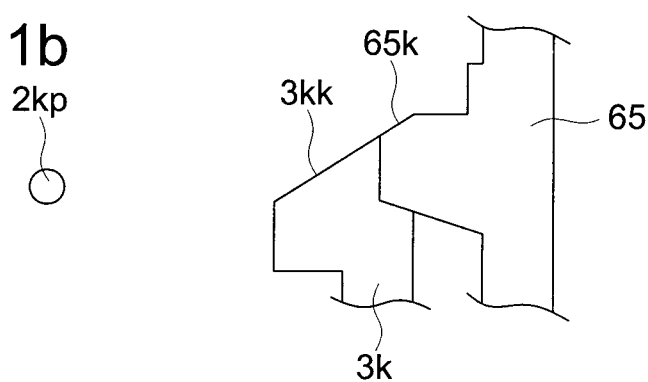

When the lens barrel is placed in the protruded state as illustrated in FIG. 8, the pin 2kp, cam-shaped portion 3kk and cam-shaped portion 65k are separated from one another, as shown in FIG. 11a. To move the lens barrel from the protruded state to the retracted state, the third lens group lens frame 3k is moved toward the bottom board 65 side (imaging element side), as described above. Then the cam-shaped portion 3kk formed on the third lens group lens frame 3k is aligned with the upper portion of the cam-shaped portion 65k formed on the bottom board 65, as shown in FIG. 11b, with the result that the cam is made in a continuous integral shape.

Figure 11C:
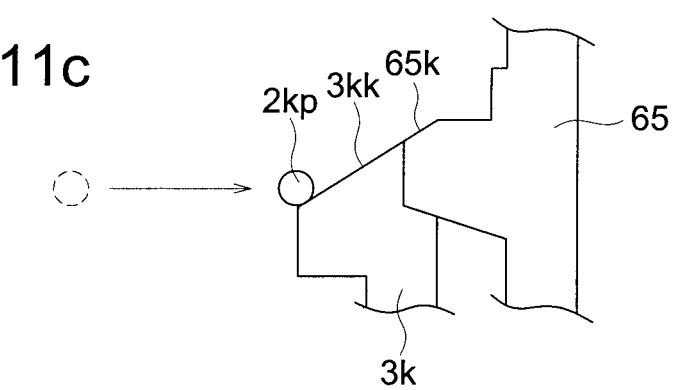
Figure 11D:
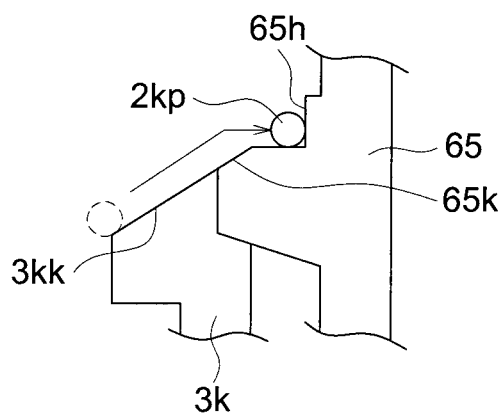

Upon completion of the traveling of the third lens group lens frame 3k, the second lens group moving frame 66 travels toward the bottom board 65 (toward imaging element), as described above. The pin 2kp formed on the cylindrical portion 2kt of the second lens group lens frame 2k starts to be engaged with the cam-shaped portion 3kk, as shown in FIG. 11c. When the pin 2kp has been engaged with the cam-shaped portion 3kk, the pin 2kp is moved along the slope of the cam shape. The second lens group lens frame 2k of FIG. 10 is swung in the direction opposite to the B-marked direction against the bias force of the torsion coil spring 68. When the second lens group moving frame 66 has moved further toward the bottom board 65, the pin 2kp is transferred to the cam-shaped portion 65k from the cam-shaped portion 3kk. The lens frame 2k is further swung in the direction opposite to the B-marked direction and is located at a prescribed evacuation position (wherein the optical axis is different from those of other lens groups).

When the pin 2kp has come in contact with the bottom 65h of the cam-shaped portion 65k, the second lens group lens frame 2k is slid and moved along the rotary shaft 67 of FIG. 10 in the direction opposite to the A-marked direction against the bias force of the torsion coil spring 68, by the movement of the second lens group moving frame 66 toward the bottom board 65.

Owing to the above, the second lens group lens frame 2k travels to the position where the optical axis is different from those of other lens groups, and the refracted state of FIG. 9 is attained.

To be more specific, the lens barrel of the second embodiment ensures that, in the process of changing from the protruded state to the retracted state, the second lens group lens frame 2k to be shifted to the position where the optical axis is different from those of other lens groups is swung by being engaged with the cam-shaped portion 3kk (the first engagement member) formed on the third lens group lens frame 3k. After that, the lens frame 2k is transferred to the cam-shaped portion 65k (the second engagement member) formed on the bottom board 65 to be engaged therewith. The process of the retraction is now completed.

As described above, the engagement member is configured to be divided into different components, and is combined into a continuous configuration at the time of the retraction. This structure allows the height of individual engagement members (length in the direction of optical axis) to be reduced and the moldability to be enhanced. Further, the second engagement member exposed to spring bias force at the time of retraction can be formed on the bottom board of a fixed member as a short projection, and sufficient strength is provided. This structure provides an engagement section rigid enough to resist the spring bias force, and enhances operation reliability. Further, the engagement section can be made of resin, with the result that cost reduction is achieved.

The second embodiment has been described with reference to an example where a cam shape is also formed on the second engagement member formed on the bottom board 65. Without the present invention being restricted thereto, it is also possible to make such arrangements that the cam is formed only on the first engagement member, and the second engagement member is provided only with a shape capable of catch.

The aforementioned embodiments have been described with reference to an example of the lens barrel for holding the image pickup optical system composed of three lens groups. Without being restricted thereto, the present invention is applicable to the lens barrel provided with at least two lens groups so that, at the time of retraction, one lens group is moved to the position where the optical axis is different from that of another lens group.

According to the embodiments of the present invention, a thin lens barrel of enhanced operation reliability is provided at a reduced cost.

What is claimed is:

1. A lens barrel comprising:
   an image pickup optical system including a plurality of lens groups;
   a barrel member which holds the image pickup optical system and is protruded and retracted;
   a lens frame which holds a lens group of the image pickup optical system and is configured to be able to swing;
   a first engagement member including a cam-shaped portion configured to swing the lens frame by engaging with the lens frame to move the lens group to a position where an optical axis of the lens group is different from an optical axis of another lens group when the barrel member is retracted; and
   a second engagement member configured to engage with the lens frame, the second engagement member being an individual member separate from the first engagement member,
   wherein, when a state of the barrel member changes from a protruded state to a retracted state, the lens frame is swung while being engaged with the cam-shaped portion of the first engagement member, and then the lens frame is engaged with the second engagement member,
   wherein, in the retracted state, the lens frame is separated from the cam-shaped portion of the first engagement member by engaging with the second engagement member.

2. The lens barrel of claim 1,
   wherein the second engagement member is a part of a mechanism for camera shake compensation.

3. The lens barrel of claim 2,
   wherein the lens frame is further swung by the mechanism for camera shake compensation.

4. The lens barrel of claim 1,
   wherein a cam shape is formed on the second engagement member, and the lens frame is further swung by the cam shape of the second engagement member.

5. An image pickup apparatus comprising:
   the lens barrel of claim 1; and
   an imaging element for photoelectric conversion of a subject image.

6. The lens barrel of claim 1,
   wherein, in the process of changing the state of the barrel member, positions of the first engagement member and the second engagement member change relative to each other.

7. The lens barrel of claim 6,
wherein, in the retracted state, the second engagement member keeps the lens group by engaging with the lens frame.

8. The lens barrel of claim 7,
wherein, in the retracted state, the second engagement member keeps the lens group instead of the first engagement member.

9. The lens barrel of claim 1,
wherein the second engagement member keeps the lens group by engaging with the lens frame in the retracted state.

10. The lens barrel of claim 9,
wherein, in the retracted state, the second engagement ember keeps the lens group instead of the first engagement member.

11. The lens barrel of claim 1,
wherein, when the state of the barrel member changes from the protruded state to a retracted state, the first engagement member gets contact with the second engagement member.

\* \* \* \* \*